United States Patent [19]
Bradley et al.

[11] 3,864,985
[45] Feb. 11, 1975

[54] DRIVE TRANSMISSION

[76] Inventors: Walter W. Bradley, 1525 Hess Rd., Redwood City, Calif. 94003; Charles S. Blair, Jr., 226 Stockbridge Ave, Atherton, Calif. 94025

[22] Filed: Jan. 26, 1973

[21] Appl. No.: 326,577

Related U.S. Application Data
[63] Continuation-in-part of Ser. No. 229,880, Feb. 28, 1972, abandoned.

[52] U.S. Cl. .................................. 74/125.5, 192/65
[51] Int. Cl. ............................................ F16d 27/10
[58] Field of Search ................... 74/125.5, 122, 123; 192/65, 93 R

[56] References Cited
UNITED STATES PATENTS

| | | | |
|---|---|---|---|
| 2,521,067 | 9/1950 | Kenison | 74/122 |
| 2,743,804 | 5/1956 | Roberts | 192/65 |

FOREIGN PATENTS OR APPLICATIONS

| | | | |
|---|---|---|---|
| 3,773 | 0/1898 | Great Britain | 192/65 |
| 332,259 | 8/1958 | Switzerland | 74/122 |

*Primary Examiner*—Benjamin W. Wyche
*Assistant Examiner*—Wesley S. Ratliff, Jr.
*Attorney, Agent, or Firm*—Philips, Moore, Weissenberger Lempio & Strabala

[57] ABSTRACT

A drive transmission having a drive shaft and means for rotating the shaft. Spaced dogs are rotated by the shaft and these dogs are biased in a direction substantially inwardly of the axis of rotation of the shaft. The amount of force required to rotate the shaft can be varied. In one embodiment, this may be accomplished by a cam member rotated by the shaft engaging rollers on the dogs, which rollers have tapered surfaces engaging varying irregular surfaces on the cam member. In another embodiment, this may be accomplished by having the cam member rotated directly by the shaft engaging spaced balls mounted in a race housing, the balls being movable in a direction parallel to and at right angles to the axis of rotation of the shaft.

15 Claims, 18 Drawing Figures

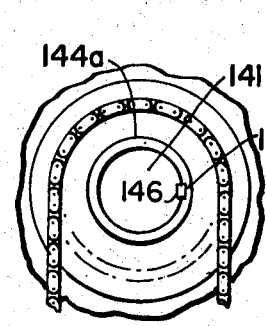
FIG_8a
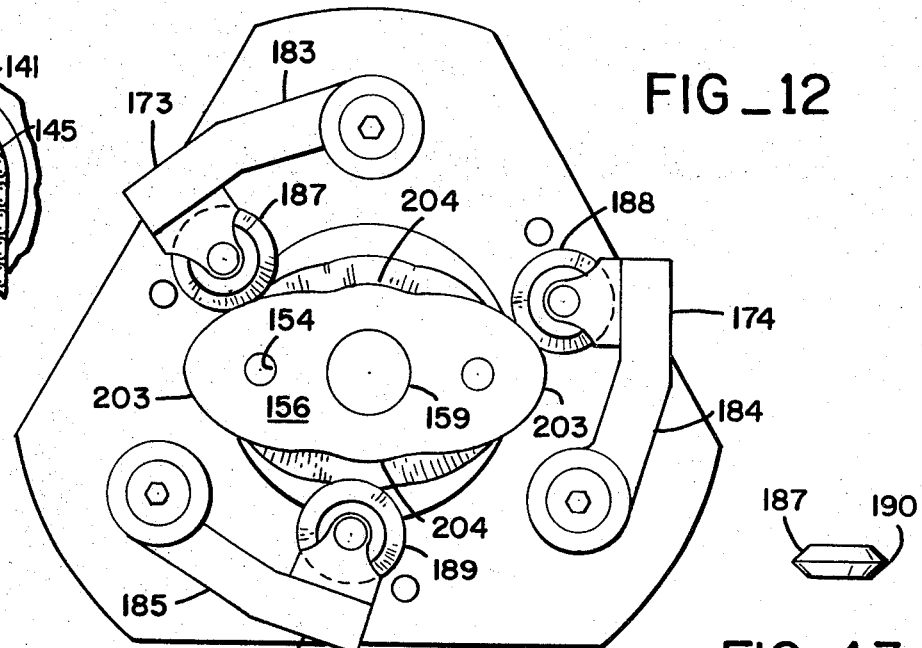
FIG_12
FIG_13
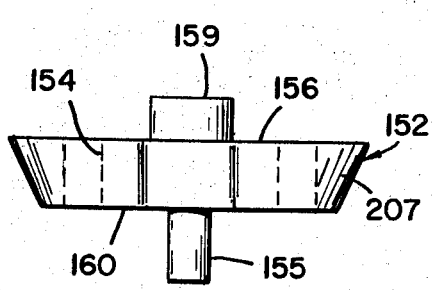
FIG_9
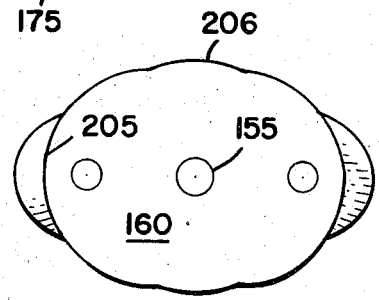
FIG_10
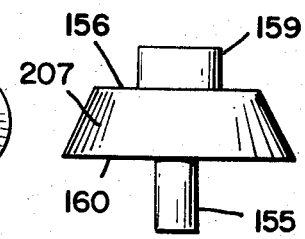
FIG_11
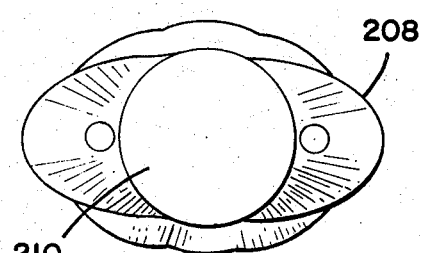
FIG_17
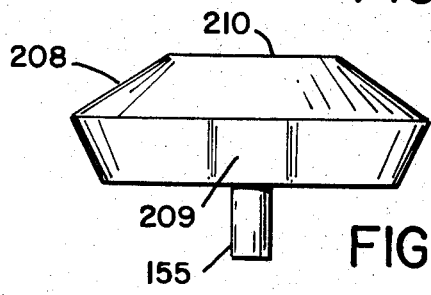
FIG_16
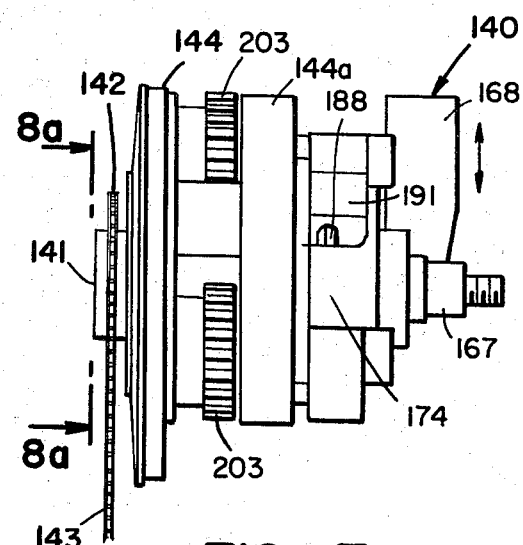
FIG_7

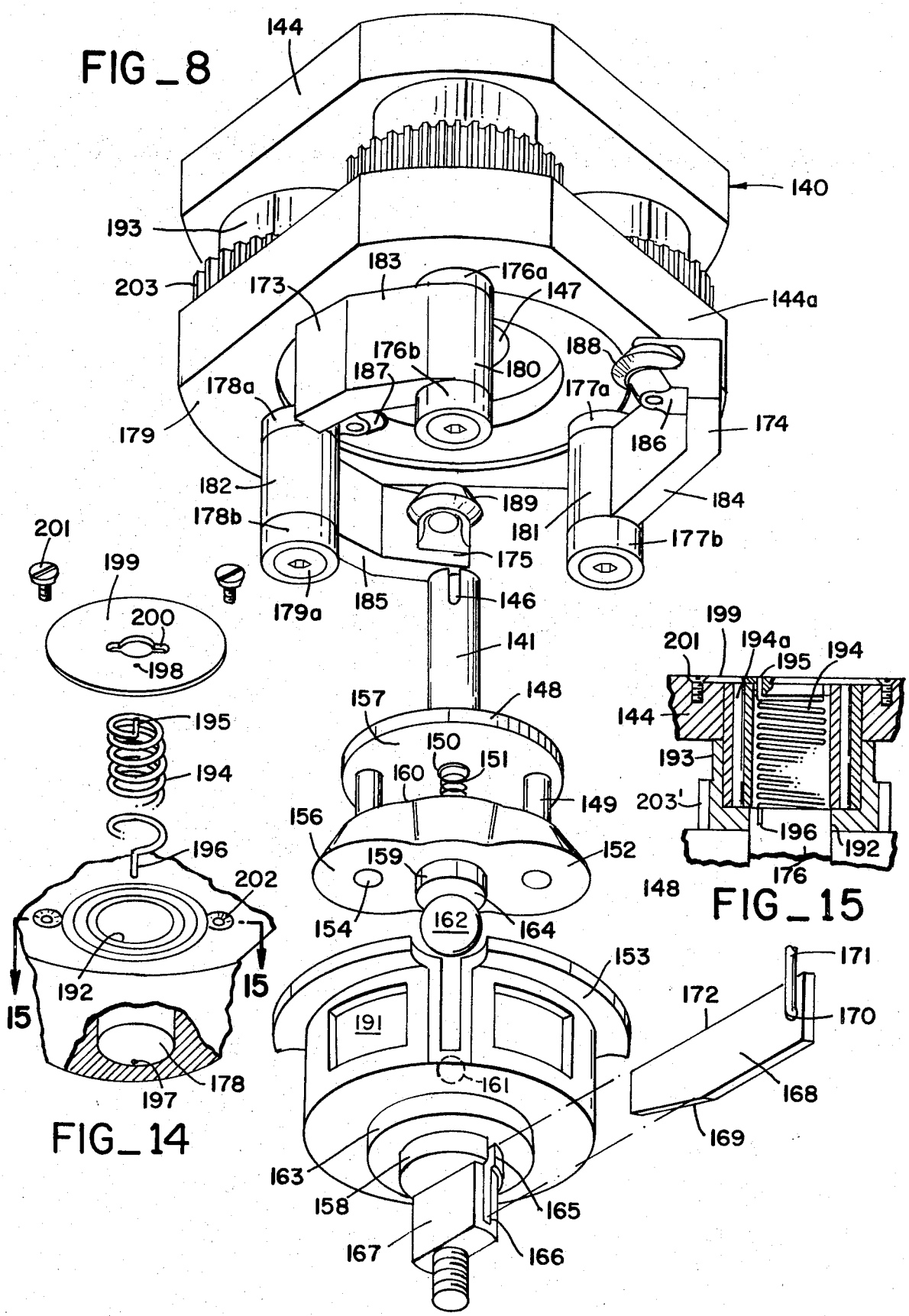

DRIVE TRANSMISSION

CROSS-REFERENCE TO RELATED APPLICATION

This application is a continuation-in-part application Ser. No. 229,880, filed Feb. 28, 1972 now abandoned, by Walter W. Bradley and Charles S. Blair, Jr.

BACKGROUND OF THE INVENTION

1. Field of the Invention

This invention relates to drive transmissions; and, more particularly, to a drive transmission having a relatively infinite variable ratio between the highest and lowest ratios possible.

2. Description of the Prior Art

Transmissions of many types have heretofore been provided which include provisions for various drive ratios. However, with such transmissions, it has not been possible to obtain an infinitely variable ratio between the highest and lowest ratios possible with the transmission. In addition, it has been difficult to obtain such transmissions which do not have any substantial backlash. There is, therefore, a need for a new and improved transmission.

SUMMARY OF THE INVENTION

It is an object of this invention to provide a drive transmission which has an infinitely variable ratio between its highest and lowest ratios.

It is a further object of this invention to provide a transmission of the above character which has substantially no backlash and which will permit operation in clockwise and counterclockwise directions.

It is another object of this invention to provide a transmission of the above character which has fewer moving parts and which can be adjusted for different loads.

It is still another object of this invention to provide a drive transmission which can be readily adjusted so that it can be operated by operators capable of exerting differing forces.

These and other objects are preferably accomplished by providing a drive transmission having a drive shaft and means for rotating the shaft. Spaced dogs are rotated by the shaft and these dogs are biased in a direction substantially inwardly of the axis of rotation of the shaft. The amount of force required to rotate the shaft can be varied. In one embodiment, this may be accomplished by a cam member rotated by the shaft engaging rollers on the dogs, which rollers have tapered surfaces engaging varying irregular surfaces on the cam member. In another embodiment, this may be accomplished by having the cam member rotated by the shaft engaging spaced balls mounted in a race housing, the balls being movable in a direction parallel to and at right angles to the axis of rotation of the shaft.

BRIEF DESCRIPTION OF THE DRAWING

FIG. 7 is a side view showing a modified drive transmission in accordance with the teachings of our invention and shows the same incorporated into a sprocket for a bicycle or the like;

FIG. 8 is an exploded view of the transmission of FIG. 7;

FIG. 8a is a view taken along line 8a–8a of FIG. 7;

FIGS. 9 through 11 are side, top plan, and end views, respectively, of the cam member of the transmission of FIGS. 7 and 8;

FIG. 12 is a bottom plan view of the cam member and dogs associated therewith of the drive transmission of FIGS. 7 and 8;

FIG. 13 is a side view of one of the rollers of the dogs of FIG. 12;

FIG. 14 is an exploded view of the means for biasing the dogs of the transmission of FIGS. 8 and 12;

FIG. 15 is a view taken along the lines 15—15 of FIG. 14, the parts thereof being in assembled position; and FIGS. 16 and 17 are top plan and side views, respectively, of a modification of the cam member of FIGS. 8–12.

DESCRIPTION OF THE PREFERRED EMBODIMENTS

Figure 1:
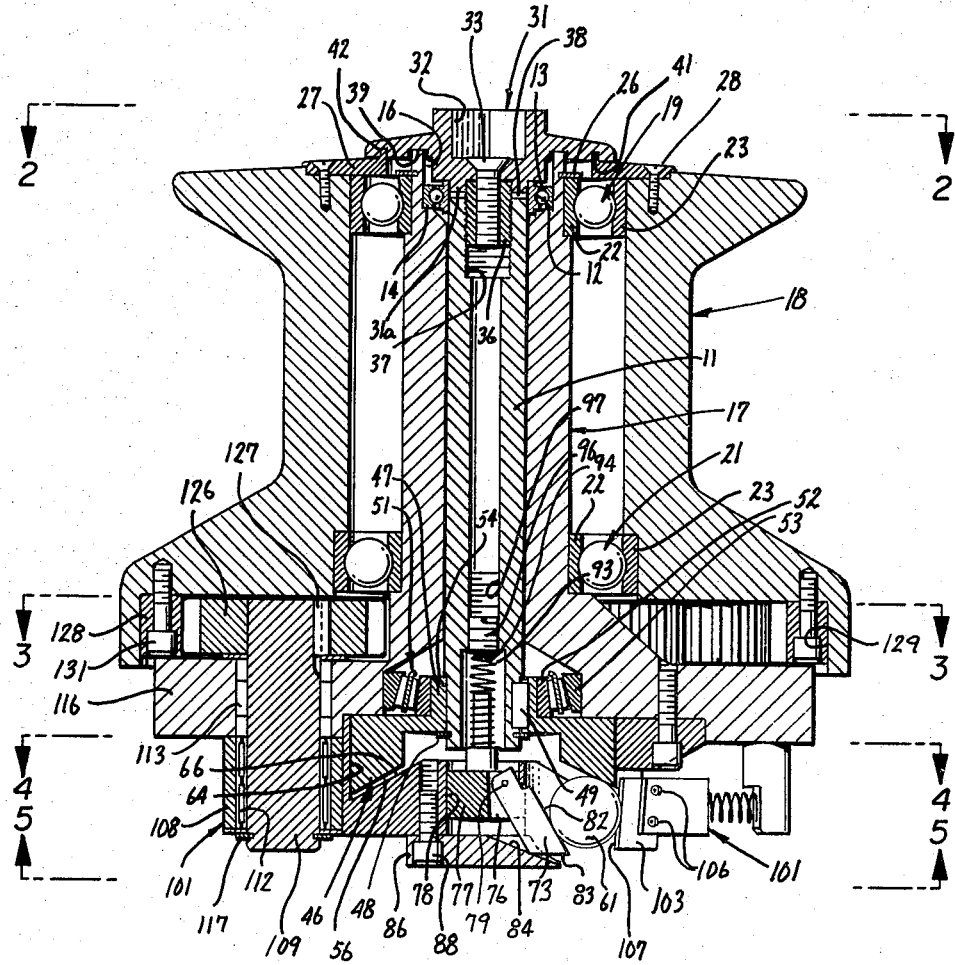
FIG. 1 is a vertical cross-sectional view of a first embodiment of the drive transmission of our invention and shows the same incorporated into a winch.
Figure 2:
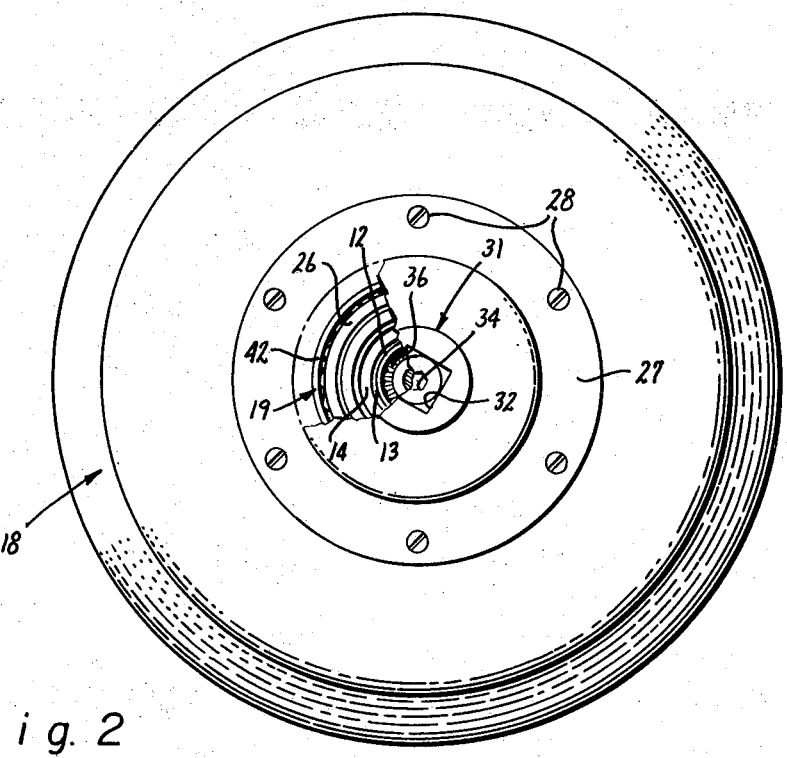
FIG. 2 is a top plan view with certain parts broken away looking along line 2—2 of FIG. 1.
Figure 3:
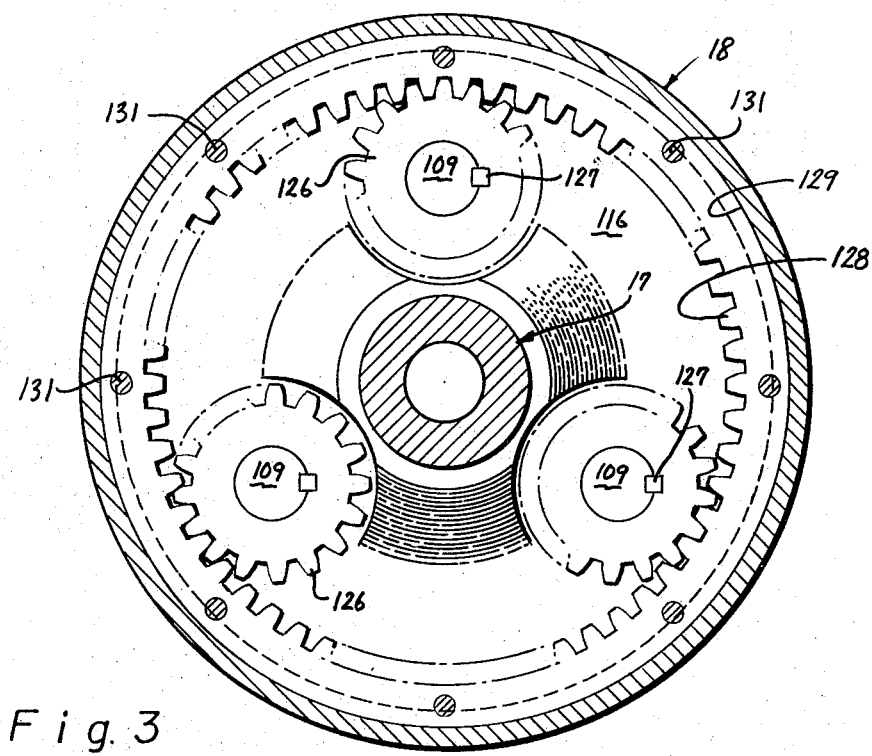
FIG. 3 is a cross-sectional view looking along the line 3—3 of FIG. 1.
Figure 4:
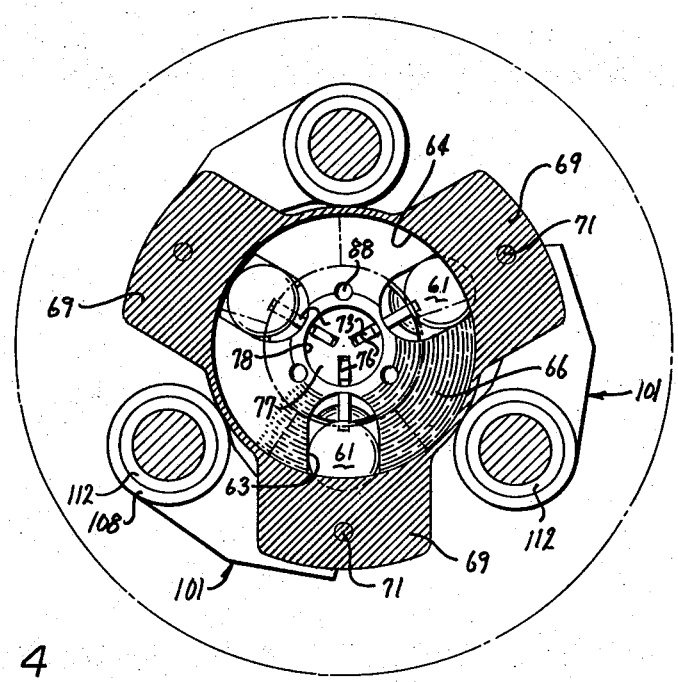
FIG. 4 is a cross-sectional view looking along the line 4—4 of FIG. 1.
Figure 5:
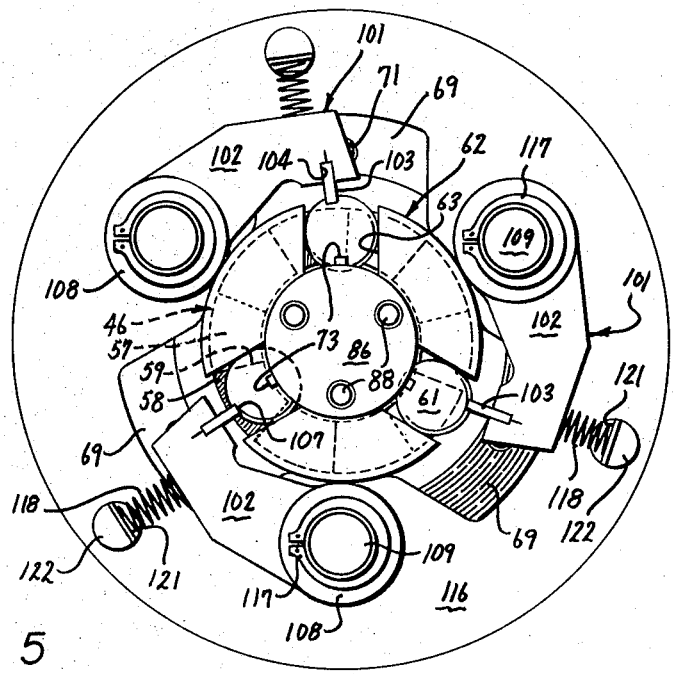
FIG. 5 is a bottom plan view looking along the line 5—5 of FIG. 1.

Referring to FIG. 1 of the drawing, a drive in accordance with our invention may be incorporated in a winch as one example of use of the transmission. The transmission and the winch incorporating the same consists of a drive shaft 11 which has its upper end seated within an inner race 12 of a ball bearing assembly 13. The outer race 14 of the above ball bearing assembly 13 is seated within a cylindrical recess 16 opening through the upper end of a spindle 17.

A winch drum 18 is rotatably mounted upon the spindle 17 by means of upper and lower ball bearing assemblies 19 and 21 respectively and in which the inner race 22 of each of the ball bearing assemblies 19 and 21 engage the upper extremity and an intermediate portion of the outer surface of the spindle 17 as shown particularly in FIG. 1. The outer race 23 of each of the ball bearing assemblies 19 and 21 engage opposite extremities of the inner surface 23 of the winch drum 18. A snap ring 26 engages the outer extremity of the spindle 17 and serves to retain the upper ball bearing assembly 19. The upper ball bearing assembly 19 is also retained by a bearing retaining ring 27 which is secured to the upper end of the winch drum 18 and by suitable means, such as a plurality of screws 28.

Means is provided for driving the drive shaft 11 and consists of a drive nut 31. The drive nut 31 is provided with a rectangular recess 32 which is open at the top and which is adapted to receive one end of a crank which can be utilized by an operator for operating the winch. A screw 33 is rotatably mounted in the nut with its head being exposed in the rectangular recess 32. The head is provided with a hexagonal recess 34 of the type which is adapted to be engaged by a conventional allen-head wrench. A member or stud 36, which is externally and internally threaded, is threaded onto the screw 33 and is rotatably mounted on the screw 33. The member or stud 36 is adapted to be threaded into an internally threaded bore 37 which opens through the top end of the drive shaft 11. The screw 33 is provided for bringing the drive nut 31 into engagement with the drive shaft 11 so that the drive shaft 11 will be driven by the drive nut. Suitable means is provided for forming a driving engagement between the drive nut 31 and the drive shaft 11 in the form of castellations 38 on the upper end of the shaft 11 and on the depending portion 31a of the drive nut 31. These castellations 38 are brought into engagement with each other by rotation of the screw 33 which causes the member or stud 36 to be threaded into the bore 37. The drive nut 31 also seats against the inner race of the ball bearing assembly 13 and serves to retain it in place. The drive nut 31 is provided with an annular recess 39 which receives the upper extremity of the spindle 17 to form a seal therewith. The drive nut 31 is also provided with an additional annular recess 41 which cooperates with a seal ring 42 provided on the bearing retaining ring 27 to form a seal between the nut 31 and the bearing retaining ring 27.

A cam member 46 is mounted on the lower end of the drive shaft 11 and is provided with a hub 47 which is retained on the drive shaft 11 by retaining ring 48. The hub 47 is also secured to the drive shaft 11 by a key 49. A thrust bearing 51 is mounted on the hub 47 and has an inner race 52 engaging the outer surface of the hub 47 and has its outer race 53 seated in a cylindrical recess 54 provided in the lower end of the spindle 17.

Figure 6:
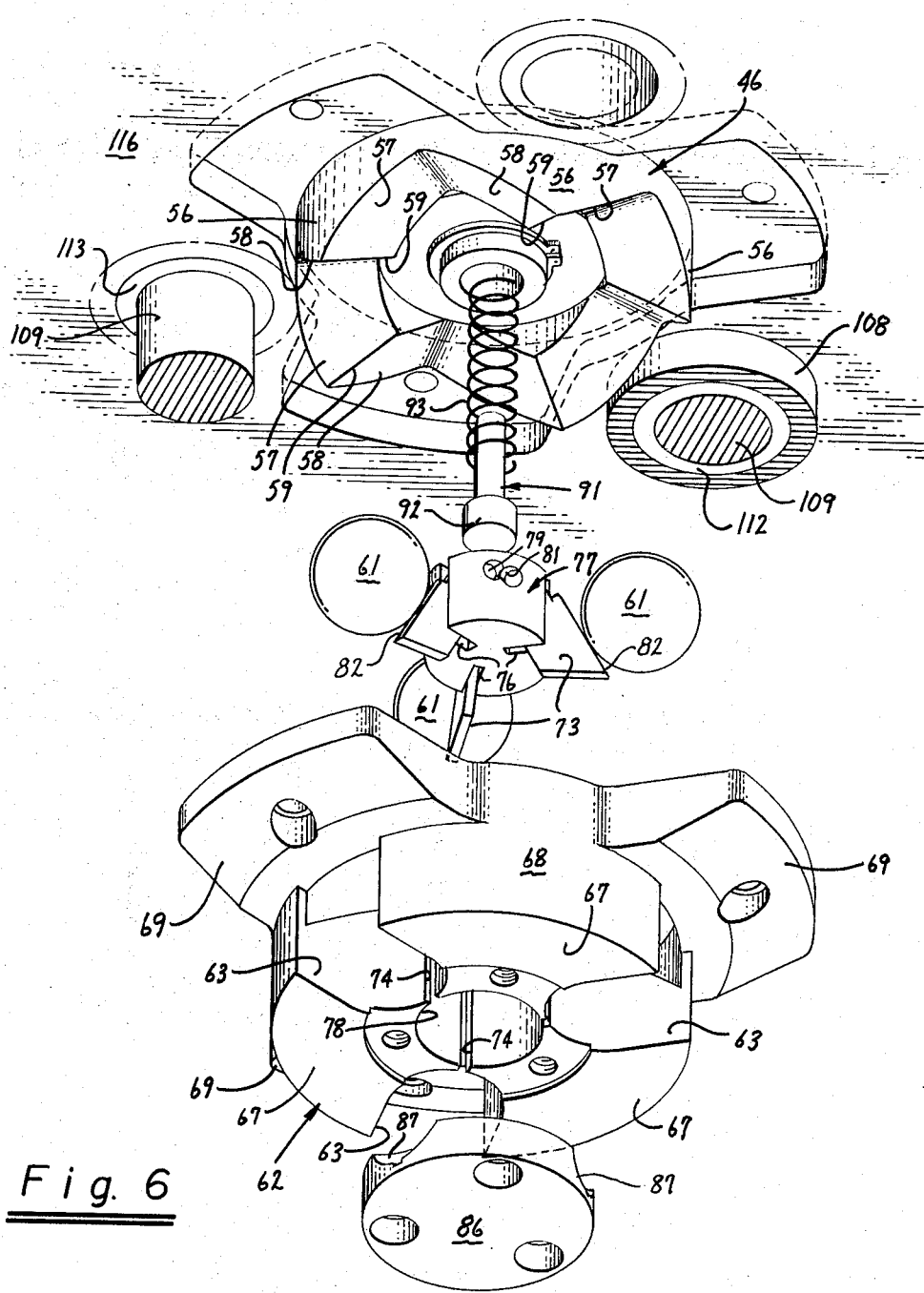
FIG. 6 is an exploded view showing the ball-cam drive portion of the transmission of FIGS. 1 through 5.

The cam member 46 is provided with a plurality of lobes 56, for example, five as shown in FIG. 6 which extend in a direction which is generally parallel to the axis of rotation of the shaft 11. The lobes 56 are symmetrical and each is provided with a pair of surfaces 57 and 58 which are inclined as hereinafter described to provide an apex 59 in the form of a line. The surfaces 57 and 58 are inclined upwardly from a horizontal plane perpendicular to the axis of rotation for the shaft 11 at an angle ranging from 5° to 50° depending upon the number of lobes and the efficiency desired. This embodiment shows an angle of approximately 30°, for example. The surfaces 57 and 58 are also inclined inwardly with respect to the same horizontal plane at an angle ranging from 5° to 50° as shown having an angle of approximately 29°, also for example.

At least two balls 61 are provided and, as shown in this embodiment, three balls are provided which are adapted to be engaged by the lobes 56 of the cam member 46. The balls 61 may be of any suitable size as, for example, ranging from ¼ inch to 6 inches diameter. In the present embodiment, they have a diameter of approximately 1 inch. A race housing 62 is provided for receiving the balls 61. The race housing is provided with a number of slots 63 equal to the number of balls 61. The race housing 62 is provided with a cylindrical recess 64 which is adapted to receive the cam member 46 with its downwardly extending lobes 56. The race housing 62 is provided with a truncated conical surface 66 to accommodate the lobes 56. The race housing 62 is also provided with a planar bottom surface 67 which extends at right angles to the axis of rotation for the drive shaft 11. The race housing 62 is also provided with a cylindrical sidewall surface 68. The slots 63 which are provided for the balls 61 have a width which is only slightly larger than the diameter of the balls 61. The slots open through the truncated conical surface 66 through the planar bottom surface 67 and also through the cylindrical sidewall surface 68.

Means is provided for securing the race housing to the spindle so as to permit relative rotation about a relative axis between the cam member 46 and the race housing 62 and consists of three circumferentially spaced ears 69 which are secured to the lower extremity of the spindle 17 by suitable means, such as conventional allen-head screws 71.

As can be seen, particularly in FIG. 6, the slots 63 are provided with spaced vertical parallel sidewalls which are joined by a curved inner wall that has a radius of curvature corresponding generally to the radius of curvature of the ball 61 which is adapted to move within the slot 63.

Means is provided for retaining the balls 61 in the slots 63 and for adjusting the positions of the balls 61 in the slots 63 and consists of adjustable cam members 73 which extend through slots 74 in the race housing 62 which open into the slots 63. One of the cam members 73 is provided for each of the slots 63. The cam members 73 extend into slots 76, spaced 120° apart, in a cylindrical member 77 which is slidably mounted in a cylindrical bore 78 provided in the race housing 62. The cam members 73 are pivotally mounted on the cylindrical member 77 by pins 79 which extend through the cam member 73 and into the cylindrical member 77. The cylindrical member 77 is provided with holes 81 so that the pins 79 can be inserted and removed. Each of the cam members 73 is provided with a cam surface 82 which is adapted to engage the associated ball 61. In addition, it is provided with a cam surface 83 which is adapted to engage a cooperating cam surface 84 in a circular member 86. When three balls 61 are utilized, three of the cam surfaces 84 are provided which are spaced 120° apart. The cam surfaces 84 open into spherical recesses 87 provided on the cam member 86 and which are adapted to accommodate the balls 61. The member 86 is secured to the race housing 62 in a suitable manner such as by conventional allen-head screws 88.

Adjustable means is provided for yieldably urging the member 77 in a direction toward the cam member 86 and consists of a pin 91 which is provided with a head 92 that engages the member 77. A compression spring 93 is mounted coaxially on the pin 91 and has one end engaging the head 92 and has the other head engaging a button 94. The button 94 is seated in a screw 96 which is threadedly mounted in a bore 97 provided in the drive shaft 11 and extending axially of the drive shaft 11. The bore 97 opens through the threaded bore 37 so that the screw 96 can be engaged by a conventional allen-head wrench so that it can be adjusted to vary the force supplied by the spring 93 for purposes hereinafter described.

Means is provided for sensing the positions of the balls 61 within the slots 63 of the race housing 62 and consists of dogs 101. One dog 101 is provided for each of the balls 61. Each of the dogs 101 is provided with an arm 102 and carries a ball-engaging member 103 that is removably mounted in a slot 104 provided in the free end of the arm 102 and retained therein by suitable means such as set screws 106. The ball-engaging members 103 are provided with inclined ball-engaging surfaces 107 which are inclined from the vertical by approximately 7° but could range from 2° to 45° from the vertical. Each of the dogs 101 is provided with a hub 108 which is mounted on a shaft 109. Conventional one-way slip clutch means is provided for mounting the hub of each of the dogs 101 on the shaft 109. Such a conventional one-way slip clutch means may consist of two one-way slip clutch bearings 112 of a suitable type such as a conventional spague clutch. Conventional one-way slip clutch bearing means has also been provided for mounting the shaft 109 within a flange 116 provided on the spindle 17. Such a one-way slip clutch bearing means may likewise consist of a one-way slip clutch bearing assembly 113 of the same suitable type as indicated above.

The hub 108 is secured to the shaft by a retaining ring 117. Means is provided for yieldably urging the free end of the dog 101 toward the associated ball 61 and consists of a spring 118 having one end seated in a well (not shown) provided in the dog 101 and having the other end engaging a flat 121 provided on a post 122 which is mounted in the flange 116 and extending downwardly therefrom.

A pinion gear 126 is keyed to the upper end of each of the shafts 109 by a key 127. Thus, there are provided three pinion gears 126 which engage a large ring gear 128 that is mounted in a large cylindrical recess 129 provided in one end of the winch drum 18. The ring gear 128 is secured to the winch drum 18 by suitable means, such as conventional allen-head screws 131.

Operation and use of the transmission incorporating the present invention and a winch incorporating the same may now be briefly discussed as follows.

Let it be assumed that the transmission has been incorporated in a winch as shown in the drawings and that the winch has been mounted on a boat for pulling in lines or halyard. Of course, the drive transmission of FIGS. 1 through 6 is not limited to a winch and may obviously have many other applications. Particular means for mounting the winch on a boat has not been shown. It is readily apparent that various types of mounting means can be utilized. For example, the mounting means could be in the form of a cup-shaped receptacle secured to the bottom of the winch which, in turn, could be secured to the boat by screws or by a quick disconnect type of connection in association with another member secured to the boat.

Let it next be assumed that the winch has been mounted on a boat and it is desired to adjust the winch and/or the transmission so that it may be conveniently operated by the person planning to use the same. For example, let it be assumed that the person is capable of applying 50 pounds of force to the handle which is mounted in the drive nut. This adjustment is accomplished by removing the drive nut 31 by the screw 33 and then inserting a conventional elongated allen-head wrench into the bore 97 to operate the screw 96 to adjust the force exerted by the spring 93 on the cylindrical member 77. As the screw 96 is threaded inwardly, the spring 93 applies a greater force to the cylindrical member 77 which will urge the cam members 73 against the cam surface 84 to thereby urge the balls 61 outwardly and upwardly to thereby cause the transmission to operate at a higher ratio which, in turn, would require more power or force to be applied to the handle to operate the winch. Conversely, when it is desired to decrease the force with which it is desired to operate the winch, the screw 96 is operated to decrease the force applied by the spring 93.

Let it be assumed that the transmission and the winch have been set for the desired force as shown in FIG. 1. As the crank is rotated in a clockwise direction as viewed in FIG. 2, the drive nut 31 also may be operated in a clockwise direction. This will cause the cam member 46 to be operated in a clockwise direction and to cause the lobes 56 to engage the balls 61 as the cam member is rotated. As each ball 61 is engaged by a lobe 56, it will be urged downwardly and outwardly against the cam surface 82 of the cam member 73 and the ball 61 will engage the surface 107 of the member 103 to urge the free end of the dog 101 outwardly to cause rotation of the hub 108 and the shaft 109 through the one-way clutch assembly to cause rotation of the shaft 109 and the pinion gear 126 carried thereby to cause rotation of the ring gear 128. Since three balls 61 have been provided in conjunction with the five lobes 56, there is always one ball 61 which is moving up and there is also always one ball 61 which is moving down. At no time is there a high center or a dead center. As each ball 61 is being moved down, it causes a force to be applied to its associated dog 101 which, in turn, causes its pinion gear 126 to cause rotation of the ring gear 128. Thus, since there is always one ball 61 which is moving, continuous rotational forces will be applied to the ring gear 128 which, in turn, will cause rotation of the winch drum 18. Regardless of the load which is placed on the winch, the force which is required for the operation of the winch will remain substantially constant. This is true because the transmission adjusts for variation in the forces by changing the ratio between the drive shaft 11 and the drum 18.

By way of example, as the load on the drum 18 is increased, greater pressures are applied to the dogs 101, the balls 61 recede because they apply greater forces to the cam members 73 which cause a member 77 to be moved upwardly against the force of the spring 93. When this is the case, there will be a lesser stroke of the dogs 101 as the cam member 46 rotates. By way of example, the stroke of the dogs 101 may be varied from approximately one-eighth inch to three-fourths inch. This variation of stroke can be obtained within the range of the high and low ratios provided for the transmission in the winch. It can be seen that ratio is infinitely variable between the high and low ratios of the transmission. In one embodiment of the invention, the low ratio was 5.4 to 1 and the high ratio was 24 to 1.

With the arrangement shown, the winch or transmission is always driven by rotating the crank in a clockwise direction. The crank is free wheeling when it is rotated in a counterclockwise direction. There is no backlash because of the action of the slip clutch bearings provided on the dogs 101. These slip clutch bearings will only drive as the drive nut 31 is being rotated in a clockwise direction. As soon as the rotation in a clockwise direction is stopped, the drum 18 will stop.

From the foregoing, it can be seen that there has been provided in FIGS. 1 through 6 a new and improved transmission and winch using the same with which it is possible to provide an infinitely variable ratio between the high and low ratios for the transmission. The transmission of FIGS. 1 through 6 may be readily adjusted so that it can accommodate different forces for operating the same. This is particularly advantageous in that it makes it possible to match the transmission or the winch to the force which can be readily supplied by the operator of the same.

The transmission and winch using the same is relatively simple in construction and has a relatively free wheeling movement of parts. The transmission and winch is a type which will never be on dead center nor does it have a dead spot. In addition, there is no backlash.

Referring now to the embodiment illustrated in FIGS. 7 through 17, a second embodiment of a drive transmission 140 is shown. Although this embodiment may be used as a winch as discussed hereinabove, obviously it too may have many other applications. Accordingly, the embodiment of FIGS. 7 through 17 will be discussed with respect to the hub of a bicycle or the like. Further, although, as shown in FIG. 7, the shaft 141 may be driven by a sprocket 142 fixed thereto (the sprocket 142 of course being rotated by chain 143), obviously instead of shaft 141, a shaft similar to shaft 11 and the means for rotating the same — as disclosed hereinabove — may be used.

In any event, shaft 141 is adapted to extend through an aperture 147 in a middle housing portion 148 (see FIG. 8) and includes a keyway 146 at the upper end thereof and extends up through an aperture 144a (see FIG. 8a) in upper housing portion 144 and out the upper end thereof (see FIG. 8). Any suitable means, such as screws or the like, may be used to secure portions 144 and 148 together. As shown in FIG. 8a, a key 145, disposed in the sidewall of aperture 144a, engages keyway 146 to securely hold the shaft 141 within the housing portions 144, 144a.

The lower end of shaft 141 terminates in a generally round plate 148 having a pair of integral downwardly extending spaced posts 149. An aperture or hole 150 is provided generally centrally of plate 148 and a spring 151 is loosely mounted therein. A cam member 152 is disposed within the lower housing portion 153. Cam member 152 is mounted for rotation by shaft 141 by means of a pair of spaced apertures 154 aligned with the posts 149. Cam member 152, as shown in FIG. 9, includes a centrally located post 155 extending from surface 160. As shown in FIG. 8, cam member 152 is keyed to plate 148 by means of posts 149 thereon extending into the apertures 154 therein. The central post 155 enters the central hole 150 of plate 148 and is biased in a downward direction by spring 151 located therein. As also clearly shown in FIG. 8, the surface 160 of cam member 152 is adjacent the lower face 157 of plate 148.

When housing portions 144, 148 and 153 are secured together as shown in FIG. 7, all of the foregoing elements are disposed internally thereof. However, lower housing portion 153 includes a cup portion 158 at the bottom thereof (the cavity of cup portion 158 is aligned with a stub or shaft 159 also centrally located on cam member 152 but extending from face 156 which is the face opposite face 160). This shaft 159 may be of a larger diameter than shaft 155 but is generally coaxial therewith.

A ball bearing 161 or the like of a relatively small diameter may be disposed in cup portion 158. A ball bearing 162 or the like of a relatively greater diameter may be disposed above ball bearing 161 and retained within housing portion 153 by the sidewalls 163 of cup portion 158 (which walls may be stepped or of varying diameter, as shown).

The diameter of ball bearing 162 is generally related to the diameter of shaft 159 of cam member 152. That is, when the various housing portions 144, 148 and 153 are secured together, ball bearing 161 is below ball bearing 162 and in direct contact therewith while ball bearing 162 is in direct contact with the lower face 164 of shaft 159. Cam member 152 is of course movable on posts 149, the apertures 154 being slightly greater in diameter than the diameters of posts 149. Cam member 152 is also biased in a downward direction via spring 151.

A slot 165 extends through the wall 166 of an extension portion 167 integral with cup portion 158. A lever 168 is adapted to be disposed in slot 165 and retained therein by the downward force of spring 151 acting on cam member 152 and ball bearings 161 and 162. Lever 168 is undercut at its bottom, as at 169, and includes an aperture 170 at one end for coupling a cable 171 or the like thereto. In operation, when assembled, the top 172 of lever 168 bears against the smaller ball bearing 161. By pulling on cable 171, lever 168 pivots within slot 165 on undercut portion 169 and pushes ball bearing 161 upwardly against the action of spring 151. The degree of pull on cable 171 determines how far ball bearing 161 is moved in its upward direction. In any event, such movement pushes cam member 152, via intermediate bearing 162, up along posts 149.

Although a specific arrangement has been disclosed for moving cam member 152 up and down posts 149, obviously various means may be used, such as direct connection of the lever or the like to the extended shaft 159 of cam member 152, to carry out such operation.

Referring now to FIG. 12, it can be seen that three dogs 173 through 175 (see also FIG. 8) are operatively connected to middle housing portion 148. Any suitable means for mounting dogs 173 through 175 may be used. For example, a like number of posts 176 may be fixedly secured at spaced locations about the bottom wall 179 of middle housing portion 148 (see FIG. 15 wherein the top of one post 176 is shown — the remaining posts 176 are similar in construction and internal of sleeves 180 through 182 and keyed thereto). These posts 176 thus include centrally located sleeves 180 through 182 which are keyed for rotation with posts 176 by any suitable means. Spacers 176a through 178a are disposed between each sleeve 180 through 182 and middle housing portion 148. Collars 176b through 178b are disposed at the tops of each sleeve and retained in position by countersunk hexagonal recess 179a or the like for receiving an allen-type wrench (not shown). Each sleeve 180 through 182 includes an integral inwardly extending arm 183 through 185 (that is, extending in a direction both normal to the longitudinal axis of shaft 145 and inwardly thereto). These arms 183 through 185 may be angled slightly at their outer ends, as shown, and terminate in a pair of spaced flanges 186 having rollers 187 through 189 journaled for rotation therein. These rollers, as for example, roller 187 in FIG. 13, taper to an annularly extending point 190.

Referring to FIG. 8, it can be seen that lower housing portion 153 includes a plurality of spaced windows 191 or the like. It is to be understood, as shown in FIG. 7, that the flanged ends of arms 183 through 185 extend inwardly of these windows 191 when the housing portions 144, 148 and 153 are assembled (that is, the dogs 173 through 175 are outside of housing portion 153 with rollers 187 through 189 extending within windows 191 as in FIG. 7).

The particular number and exact location of dogs 173 through 175 may be varied. At least two such dogs, however, are necessary to carry out our invention.

It is preferred that dogs 173 through 175 be biased inwardly toward cam member 152. In order to accomplish this, the posts 176 which are keyed to the sleeves 180 through 183 extend through apertures in middle housing portion 148 and up into apertures 192 (see FIGS. 14 and 15) formed in spacers 193 disposed between housing portions 144 and 148. A coil spring 194 is preferably disposed in each aperture 192 and terminates, at each end, in tang portions 195 and 196. Tang portion 196 is disposed in a hole 197 formed in the top of each post 176. Tang portion 195 is disposed in a hole 198 of a plate 199 which closes off the top of each aperture 192. Each plate 199 includes an elongated slot 200 therein so that the tip of a screwdriver or the like may be used to rotate plates 199 and thus increase or decrease the torsion of springs 194 and thus the torque on the dogs. Ball bearings 194a are disposed within each aperture 192 for providing rotation between the posts 176 and the housing portion 144. Finally, one or more set screws 201 may be screwed into threaded apertures 202 in housing portion 144 and the heads thereof tightened down against the peripheral edge of plate 199 to maintain the plates 199 (and of course springs 194) in position. Each spacer 193 is keyed to a ring gear 203' which may engage a larger ring gear (not shown but similar to ring gear 128) which may be the center gear of the hub of a bicycle or the like (or of course a winch as discussed hereinabove).

The unique configuration of cam member 152 will now be described with respect to FIGS. 8 through 12. As can be seen in FIG. 12, the face 156 of cam member 152 begins at a first generally elliptically curved portion 203, extends slightly inwardly, then curves slightly outwardly and back inwardly to form a second curved portion 204, then repeats portions 203 and 204, as shown. The other face 160, as shown in FIG. 10, begins at a first generally round curved portion 205, then extends and curves slightly outwardly and back inwardly to form a second curved portion 206, then also repeats portions 205, 206, as shown. The side 207 of cam member 152 tapers from surface 156 to surface 160 as shown so that, as can be seen by comparing FIGS. 9 and 11, in one direction wall 207 tapers from a point outwardly and upwardly and from another direction wall 207 tapers from a point inwardly and outwardly. The unique configuration of the wall 207 of cam member 152 is such that an angle of about 15° from the vertical is always present at some location about wall 207.

The tapered wall or point 190 of rollers 187 through 189 is such that this taper is about 20°. When the tapered walls 190 of rollers 187 through 189 engage the wall 207 of cam member 152 as shown in FIG. 12, a very novel effect takes place.

Thus, the rollers 187 through 189 have tapered edges 190, which edges 190 are always in engagement with some part of the irregular or tapered surface or wall 207 of cam member 152. That is, one roller will always be picking up as another falls off. When one roller falls off wall 207, the next roller is beginning to rise. Thus, no backlash or play is present in our transmission. A maximum angle at any point of engagement of the rollers with the cam member never exceeds 15°. Further, actuation of lever 168 may be used to raise and lower cam member 192 thus vary the points of contact of edges 190 of the rollers with the irregular surface 207.

With the cam member 152 illustrated in FIGS. 8 through 12, it would not be possible to have a neutral drive. However, as illustrated in FIGS. 16 and 17, cam member 208 may be modified to have a lower tapered or irregular surface 209 similar to surface 207 of cam member 152, then blend at the top to a generally round portion 210 (compare portion 210 in FIG. 17 with the middle of the top face 156 of cam member 152 in FIG. 12). Thus, when the tapered edges 190 of the rollers engage round portion 210, a completely neutral position occurs.

It can be seen from the foregoing that we have described very novel embodiments of a drive transmission which can have a variety of applications, two such uses being presented by way of example.

We claim as our invention:

1. A drive transmission comprising:
   a housing;
   an elongated drive shaft extending longitudinally of said housing;
   means operatively connected to one end of said shaft for rotating said shaft about its longitudinal axis;
   translating means including a cam having at least a pair of spaced lobes operatively engaging the other end of said shaft and said cam being rotatable therewith whereby rotary motion of said shaft is translated into motion transverse to the axis of rotation of said shaft;
   at least a pair of spaced dogs each comprising an arm having one end mounted on said housing for rotation about an axis parallel to the axis of rotation of said shaft and extending in a direction transverse to the axis of rotation of said shaft to a free end;
   biasing means operatively engaging both said housing and said dogs for biasing said free ends of said arms of said dogs in a direction substantially inwardly of said housing and toward the axis of rotation of said shaft into engagement with said translating means; and
   means associated with said translating means for varying the amount of rotation thereby of each of said arms of said dogs about its axis of rotation.

2. A drive transmission comprising:
   a housing;
   an elongated drive shaft extending longitudinally of said housing;
   shaft rotating means operatively connected to one end of said shaft for rotating said shaft about its longitudinal axis;
   a cam member disposed internally of said housing and rotatable with said shaft;
   at least a pair of spaced dogs mounted in said housing extending in a direction generally perpendicular to the axis of rotation of said shaft;
   roller means connected to the free ends of each of said dogs and rotatable about an axis generally parallel to the axis of rotation of said shaft but spaced outwardly therefrom, said roller means including rollers having annular tapered surfaces thereon, the surfaces tapering generally to a point extending in a direction generally perpendicular to their axes of rotation;
   dog biasing means operatively connected to both said housing and said dogs for biasing said dogs in a direction inwardly of said housing and toward the axis of rotation of said shaft;
   said cam member having surface means thereon operatively engaging the surfaces of said rollers in such a manner that rotation of said cam member rotates said rollers about both their axes and the periphery of said cam member; and means operatively engaging said cam member for moving said cam member in a direction transverse to the points of engagement of said roller surfaces therewith.

3. The drive transmission of claim 2 wherein said dogs biasing means includes means associated therewith for varying the degree of bias of said dogs.

4. The drive transmission of claim 2 wherein said cam member surface means includes an irregular surface extending about the periphery of said cam member in a plane generally perpendicular to the axis of rotation of said shaft, said irregular surface being such that an angle of about 15° from the vertical is always present at a plurality of locations about said periphery and these locations vary from the horizontal and the surfaces of said rollers taper to a point about 20° from the horizontal so that, upon rotation of said shaft to thereby rotate said cam member, the tapered points of said rollers are always in engagement with some portion of the irregular surface of said cam member with said rollers rising up and down in differing generally vertical planes as they are rotated by the cam member.

5. The drive transmission of claim 2 wherein said cam member surface means includes an irregular surface extending about the periphery of said cam member in a plane generally perpendicular to the axis of rotation of said shaft, said irregular surface being such that an angle of about 15° from the vertical is always present at a plurality of locations about said periphery and these locations vary from the horizontal and the surfaces of said rollers taper to a point about 20° from the horizontal so that, upon rotation of said shaft to thereby rotate said cam member, the tapered points of said rollers are always in engagement with some portion of the irregular surface of said cam member with said rollers rising up and down in differing generally vertical planes as they are rotated by the cam member.

6. In a drive transmission, a cam member comprising: a body portion having an outer peripheral surface and generally elliptically shaped top and bottom portions, the outer peripheral surface having a plurality of portions thereabout, each of said portions tapering to a point having an angle of about 15° from the vertical, the position of said portions varying in generally vertical planes about the periphery of said cam member.

7. In a transmission, a shaft, a cam member secured to said shaft, said cam member having at least three lobes extending generally in a direction parallel to the axis of rotation of the shaft, at least two balls, a race housing having a number of slots at least equal to the number of balls for receiving the balls, said balls being disposed in said slots, means mounting said race housing with respect to said cam member to permit rotation of said cam member and race housing relative to each other with the cam lobes being adapted to engage said balls in said race housing, said slots in said race housing permitting movement of said balls in a direction parallel to and at right angles to the axis of rotation of the shaft, and means operatively engaging said balls for sensing the movement of said balls.

8. A transmission as in claim 7 together with means for adjustably positioning the balls in a direction at right angles to the axis of rotation for said shaft.

9. A transmission as in claim 8 wherein said means for adjusting the position of said balls includes a slidable member mounted within said housing, a cam member for each of the balls pivotally carried by said slidable member and extending into said slots and adapted to engage said balls, cam plate means carried by the housing and having cam surfaces engaged by said cam members, and means yieldably urging said slidable member in a direction to move said cam members in directions to urge said balls outwardly.

10. A transmission as in claim 9 wherein said yieldable means includes means for adjusting the force supplied by said yieldable means.

11. In a transmission, a shaft, a spindle rotatably mounted on said shaft, a cam member secured to said shaft, said cam member having at least three lobes extending generally in a direction parallel to the axis of rotation of the shaft, at least two balls, a race housing having a number of slots at least equal to the number of balls for receiving the balls, said balls being disposed in said slots, means mounting said race housing with respect to said cam member to permit rotation of said cam member and race housing relative to each other with the cam lobes being adapted to engage said balls in said race housing, said slots in said race housing permitting movement of said balls in directions parallel to and at right angles to the axis of rotation of the shaft, a ring gear rotatably mounted on the spindle, at least two pinions engaging the ring gear, second shafts rotatably mounted in the spindle for each of said pinions, means securing each of said pinions to its respective shaft, a dog for each second shaft, a one-way slip clutch means mounting each dog on its respective second shaft, each of said dogs having a ball-engaging surface adjacent its free end, and means yieldably urging the free end of the dog in a direction so that the ball-engaging surface engages a ball.

12. A transmission as in claim 11 together with means for adjustably positioning the balls in a direction at right angles to the axis of rotation for said shaft.

13. A transmission as in claim 11 wherein said means for adjusting the position of said balls includes a slidable member mounted within said race housing, a cam member for each of the balls pivotally carried by said slidable member and extending into said slots and adapted to engage said balls, a cam plate secured to said race housing and having cam surfaces engaged by said cam members, and means yieldably urging said slidable member in a direction to move said cam members to urge said balls outwardly.

14. A transmission as in claim 13 wherein said yieldable means includes means for adjusting the force supplied by said yieldable means.

15. A transmission as in claim 11 wherein said cam lobes are formed by surfaces which extend at an angle with respect to a horizontal plane and which also extend at an angle with respect to a vertical plane.

* * * * *